3,825,418
ALLOYS FOR ISOLATION OF HYDROGEN
James J. Reilly, Bellport, and Richard H. Wiswall, Jr., Brookhaven, N.Y., assignors to the United States of America as represented by the United States Atomic Energy Commission
No Drawing. Filed Jan. 30, 1973, Ser. No. 327,897
Int. Cl. C22c 9/06, 19/00
U.S. Cl. 75—159                              4 Claims

ABSTRACT OF THE DISCLOSURE

A group of alloys capable of reversible absorption of hydrogen in the presence of CO and $CO_2$ having the chemical formula of $LaNi_xCu_{5-x}$ where $x$ is any number from above zero to less than five. Also disclosed are alloys of mischmetal with either nickel or copper. The hydrides are also described.

CROSS-REFERENCE TO RELATED APPLICATION

Ser. No. 251,874, filed: May 10, 1972, for: Separation of Hydrogen From Other Gases, Applicants: Reilly et al., AEC Docket No. S-40,728.

BACKGROUND OF THE INVENTION

The invention described herein was made in the course of, or under a contract with the U.S. Atomic Energy Commission.

Hydrogen used as a fuel for portable fuel cell power-plant systems may be produced by the steam reforming of hydrocarbon fuel. In the resulting product the hydrogen is mixed with other products of the reaction including $O_2$, CO, and $CO_2$, plus any excess $H_2O$.

In order to use the hydrogen it is necessary to separate it from these other gaseous products. One method in current use for accomplishing this, involving selective diffusion through palladium-silver membranes, is very expensive. Other methods which can be used are also expensive or suffer other disadvantages.

It has been proposed to accomplish the separation of hydrogen from the other gaseous products of the reaction mentioned above by resorting to a selective absorption such as that described in U.S. Pat. No. 3,438,178. Under consideration have been also the absorption of hydrogen processes described in our U.S. Pats. 3,508,414, 3,375,676 and 3,315,479.

It has been found, in attempting to utilize the known hydrogen absorption processes, that presence of even small amounts of $O_2$, CO, and $CO_2$ causes a sharp decrease in the efficiency and the effectiveness of the hydrogen absorption. CO is readily reduced to a very low level by conversion to $CO_2$ or $CH_4$ by known simple procedures, but the presence of $CO_2$, sometimes in large amounts of 25% or more, represents a substantial impediment. Since these are the very products mixed with the hydrogen resulting from the reforming of the hydrocarbons described above, it is readily apparent that the alloys employed heretofore are not capable of providing the selective absorption of hydrogen in the presence of the other reaction products, especially $CO_2$, from the hydrocarbon fuels.

SUMMARY OF THE INVENTION

This invention relates to certain alloys which are capable of selectively absorbing hydrogen from a gas containing $CO_2$ in substantial amounts and CO in amounts which previously were effective to interfere with or inhibit the selective absorption of the hydrogen. The hydrides of these alloys act as convenient and readily available sources of hydrogen.

In accordance with a preferred embodiment of this invention there is provided a three component alloy having the composition $LaNi_xCu_{5-x}$ where $x$ is any number from above zero to less than five.

In another embodiment, where instead of a single rare earth there is employed mischmetal, the composition may be either $MNi_y$ or $MCu_y$ where M is mischmetal and $y$ is any number from about 4.5 to 5.5. For purposes of this invention, by mischmetal is meant herein a commercial mixture of rare earth metals with the approximate composition by weight of cerium (Ce) 56%, lanthanum (La) 24%, neodymium (Nd) 14%, praseodymium (Pr) 4%, and other rare earths 2%. The hydrides of these alloys can readily be made to release the hydrogen as described hereinbelow.

It is thus a principal object of this invention to provide an alloy of a rare earth or combination of rare earths with nickel and/or copper useful in the sorption of hydrogen in the presence of CO and $CO_2$.

Another object is to provide a hydride of the aforementioned rare earth alloys.

Other objects and advantages of this invention will hereinafter become obvious from the following description of preferred embodiments of this invention.

DESCRIPTION OF THE PREFERRED EMBODIMENTS

An alloy of the type covered by this invention may be prepared by placing ingots of metals of the types making up the alloy in proper proportions by weight in an electric arc furnace and heating the mixture in an inert atmosphere such as argon until the mixture is completely molten. The mixture is maintained molten while being mixed and then is allowed to cool. The resulting alloy is found to have composition of the original constituents placed in the furnace.

The alloy having at least three components is composed of a rare earth or an alloy thereof such as lanthanum or mischmetal with nickel and/or copper, having in one embodiment the chemical formula $LaNi_xCu_{5-x}$, where $x$ is any number from above zero to less than five.

In another embodiment the mischmetal is alloyed with nickel or copper with the chemical formula $MNi_y$ or $MCu_y$ where M is the mischmetal and $y$ is in the range of about 4.5 to 5.5.

The hydrides of the above alloys are formed by pulverizing the alloy sample, preferably so that it can pass through for example a 25 mesh screen, and sealed in a reactor where it is exposed to a hydrogen containing atmosphere at a temperature and pressure sufficient to completely hydride the alloy.

The following examples demonstrate the preferred embodiments of this invention:

Example I

An alloy was prepared by placing ingots consisting of 3.18 gm. of La, 1.45 gm. of Cu, and 5.37 gm. of Ni in an electric arc furnace with a water cooled copper hearth and heating until a melt was formed. After mixing for a few minutes the melt was allowed to cool forming an alloy whose composition was $LaCuNi_4$. This alloy was divided into several samples and hydrided as shown in the Table, Part A.

Example II

An alloy was prepared as described in the above example having the composition $LaCu_4Ni$ employing 3.08 gm. of La, 5.62 gm. of Cu, and 1.30 gm. of Ni. This alloy was divided into several samples and hydrided as shown in the Table, Part B, where only a few are listed, to indicate that various hydrogen containing compositions may be obtained.

metal copper heat supplied at a temperature above ambient may be required.

TABLE

| Sample | Gas composition | Temp., °C. | Pressure, p.s.i.a. | Flow rate, l/min. | Total flow, liters | Hydride composition |
|---|---|---|---|---|---|---|
| A. $LaCuNi_4$ | | | | | | |
| 1 | Pure $H_2$ | 25 | 870 | (1) | | $LaCuNi_4H_{6.9}$ |
| 2 | Mixture [2] | 108 | 300 | 0.2 | 4.00 | $LaCuNi_4H_{0.58}$ |
| 3 | do [2] | 108 | 344 | 0.13 | 3.00 | $LaCuNi_4H_{0.70}$ |
| 4 | do [2] | 108 | 450 | 0.2 | 4.00 | $LaCuNi_4H_{1.07}$ |
| B. $LaCu_4Ni$ | | | | | | |
| 5 | Pure $H_2$ | 22 | 575 | (1) | | $LaCu_4NiH_{4.97}$ |
| 6 | Mixture [2] | 124 | 430-460 | (1) | | $LaCu_4NiH_{2.7}$ |
| 7 | do [2] | 24 | 230-470 | 0.2 | 10.04 | $LaCu_4NiH_{0.4}$ |
| C. $LaCu_{4.5}Ni_{0.5}$ | | | | | | |
| 8 | Pure $H_2$ | 25 | 800 | (1) | | $LaCu_{4.5}Ni_{0.5}H_{3.2}$ |
| 9 | Mixture [2] | 125 | 175 | 0.08 | 3.50 | $LaCu_{4.5}Ni_{0.5}H_{1.0}$ |
| 10 | do [2] | 125 | 400 | 0.08 | 3.69 | $LaCu_{4.5}Ni_{0.5}H_{1.6}$ |
| D. $MNi_5$ where M is mischmetal | | | | | | |
| 11 | Pure $H_2$ | 25 | 600-1,000 | (1) | | $MNi_5H_{6.5}$ |
| 12 | do | 25 | 600-1,000 | (1) | | $MNi_5H_{7.1}$ |
| E. $MCu_{4.7}$ where M is mischmetal | | | | | | |
| 13 | Pure $H_2$ | 250 | 300 | (1) | | $MCu_{4.7}H_{3.03}$ |

[1] Static.
[2] 74 vol. % $H_2$, 24 vol. % $CO_2$, and 2 vol. % CO.

Example III

An alloy was prepared as described above having the composition $LaCu_{4.5}Ni_{0.5}$ employing 3.05 gm. of La, 6.30 gm. of Cu, and 0.65 gm. of Ni. This alloy was divided into several samples and hydrided as shown in the Table I, Part C, where only a few are listed, to indicate that various hydrogen containing compositions may be obtained.

Example IV

An alloy was similarly prepared from 3.23 gm. of M and 6.77 gm. of Ni having the composition of $MNi_5$ where M was mischmetal, the alloy consisting of 68 wt. percent of Ni and 32 wt. percent of mischmetal. This alloy was divided into several samples and hydrided as shown in the Table, Part D, with typical results as shown.

Example V

An alloy similar to the preceding example was prepared from 3.19 gm. of mischmetal and 6.8 gm. of Cu. The hydrided alloy is shown in Part E of the Table.

In order to remove the hydrogen from any of the alloys described herein, it is only necessary to apply the heat of decomposition of the hydride involved. In the case of the lanthanum nickel copper and the mischmetal nickel alloys venting the alloys to atmospheric pressure while supplying heat at ambient temperature will be sufficient to release the hydrogen. In the case of misch-

What is claimed is:
1. A three component alloy capable of reversible sorption of hydrogen having the chemical formula

$$LaNi_xCu_{5-x}$$

where $x$ is any number from about 0.5 to about 4.
2. The alloy of claim 1 having the formula $LaCuNi_4$.
3. The alloy of claim 1 having a formula $LaCu_4Ni$.
4. The alloy of claim 1 having the formula $LaCu_{4.5}Ni_{0.5}$.

References Cited

UNITED STATES PATENTS

| 2,824,620 | 2/1958 | De Rosset | 55—16 |
| 2,958,391 | 11/1960 | De Rosset | 55—16 |
| 3,155,467 | 11/1964 | Yamamoto et al. | 55—16 |
| 3,713,270 | 1/1973 | Farr et al. | 75—152 U X |

OTHER REFERENCES

The Rare Earths, John Wiley & Sons, N.Y. 1961, pp. 279 and 280.

Rare Earth Alloys, R. Van Nostrand Co., N.Y. 1961, pp. 154–157.

Hansen: Constitution of Binary Alloys, 2nd Ed., McGraw Hill Co., 1958, pp. 887 and 888.

CHARLES N. LOVELL, Primary Examiner

U.S. Cl. X.R.

55—16, 158; 75—153, 170